United States Patent
James

(10) Patent No.: US 9,365,995 B2
(45) Date of Patent: Jun. 14, 2016

(54) OIL SKIMMER AND VACUUM RECOVERY APPARATUS

(71) Applicant: Michael H. James, Lottie, LA (US)

(72) Inventor: Michael H. James, Lottie, LA (US)

( * ) Notice: Subject to any disclaimer, the term of this patent is extended or adjusted under 35 U.S.C. 154(b) by 176 days.

(21) Appl. No.: 13/973,729

(22) Filed: Aug. 22, 2013

(65) Prior Publication Data
US 2014/0054237 A1   Feb. 27, 2014

Related U.S. Application Data

(60) Provisional application No. 61/692,124, filed on Aug. 22, 2012.

(51) Int. Cl.
*E02B 15/04* (2006.01)
*E02B 15/10* (2006.01)

(52) U.S. Cl.
CPC ............ *E02B 15/048* (2013.01); *E02B 15/046* (2013.01); *E02B 15/106* (2013.01)

(58) Field of Classification Search
CPC ... E02B 15/045; E02B 15/046; E02B 15/048; E02B 15/106
USPC .................... 210/747.6, 776, 170.05, 170.09, 210/170.11, 242.3, 923
See application file for complete search history.

(56) References Cited

U.S. PATENT DOCUMENTS

| | | | |
|---|---|---|---|
| 3,598,501 A * | 8/1971 | Stanfield et al. ............. | 210/923 |
| 3,642,140 A | 2/1972 | Parker | |
| 3,688,506 A | 9/1972 | Marcocchio | |
| 3,690,463 A | 9/1972 | O'Brien | |
| 3,722,687 A | 3/1973 | Stebbins et al. | |
| 3,822,789 A | 7/1974 | Crisafulli | |
| 4,056,472 A | 11/1977 | Teasdale | |
| 4,194,978 A * | 3/1980 | Crema ....................... | 210/242.3 |
| 5,051,181 A * | 9/1991 | Sandkvist .................. | 210/242.3 |
| 5,108,591 A * | 4/1992 | Hagan ........................ | 210/242.3 |
| 5,118,412 A * | 6/1992 | Schmidt ..................... | 210/242.3 |
| 5,143,629 A * | 9/1992 | Lint ........................... | 210/242.3 |
| 6,251,266 B1 * | 6/2001 | Gannon et al. ............ | 210/170.05 |
| 2004/0045912 A1 * | 3/2004 | Guilmette ................. | 210/242.3 |
| 2011/0116869 A1 | 5/2011 | Crouse | |

* cited by examiner

*Primary Examiner* — Christopher Upton

(57) ABSTRACT

An oil skimmer and vacuum recovery apparatus providing a method for removing the contaminating oil floating on the surface of a water body is disclosed. The apparatus may be mounted on an oil recovery vessel and includes a vacuum head mounted to a vacuum system. The vacuum head is configured at a desired proximity above a horizontally disposed separation plate that is adjustably positionable to be placed between the water surface and a contaminating layer of floating oil. The vacuum system includes a vacuum pump and motor and an associated vacuum tank configured to a fluids collection chamber that is in communication with a fluids vacuum line attached to the vacuum head. A vacuum force is directed by the vacuum head to the layer of floating oil above the separation plate whereby and the oil layer is skimmed from over the separation plate and drawn through the vacuum head the fluids vacuum line to the fluids collection chamber where it is collected for disposal.

21 Claims, 3 Drawing Sheets

OIL SKIMMER AND VACUUM RECOVERY APPARATUS

PRIORITY

This application claims priority to U.S. Provisional Application entitled "Hands-Free Oil Skimmer Apparatus and Vacuum Collection System" bearing Ser. No. 61/692,124 filed Aug. 22, 2012, the entire content of which is incorporated by reference.

FIELD OF INVENTION

The invention relates generally to the field of oil skimming techniques. In particular, it relates to a portable and mountable hands free oil skimmer with an adjustable height mechanism which can be modified as desired and incorporated into a vacuum collection system.

BACKGROUND OF INVENTION

A problem with the transport of petroleum products and like substances is the chance of an oil spill occurring. Petroleum products have a density less than that of fresh or salt water. When an oil spill occurs it is vital to quickly collect the spilled oil material since the uncollected oil will continue to spread out along the water surface. Further, if an oil spill occurs and there is a prolonged exposure to oil contaminated water, there will likely be a detrimental effect upon marine life and the environment. While catastrophic events such as the Exxon Valdez or the Gulf Oil Spill receive national publicity, the day to day pollution problem caused by leakage and spillage of oil from shore facilities, containment vessels, and offshore facilities poses a more frequent and continuous threat. These day to day leaks and spills can create a major pollution problem often require a swift response in order to minimize their effect on the environment.

One objective of the proposed hands-free oil skimming apparatus and collection system is to provide a safe means for removal of spilled oil for work crews. Another objective of the invention is to provide a simplified method to separate oil floating on a water surface. Still another objective is to provide a rapid and simple means of removing spilled oil from the surface of water in a highly efficient and cost effective manner. These and other objectives of the invention will be apparent to those skilled in this art from the following detailed description and drawings.

SUMMARY OF THE INVENTION

The present invention is an oil skimmer and vacuum recovery apparatus used for skimming and removing a contaminating layer of floating surface oil on a water body. The oil skimmer and vacuum recovery apparatus is comprised of a vacuum head assembly attached to a vacuum system assembly. The vacuum head assembly has a nozzle or vacuum head positioned directly above a horizontally disposed surface oil separation plate. The position of the separation plate may be adjusted vertically to provide a separating barrier between the contaminating layer of floating surface oil and the water surface. The vacuum system assembly provides a suction force at the vacuum head concentrated on the floating oil above the separation plate to suction the surface oil while the separation plate restricts the suction force applied to the surrounding water surface. The vacuum system assembly also provides a collection system for containing the surface oil after it is removed from the water surface.

The vacuum head assembly may be attached to the deck of a vessel with the vacuum head and the associated horizontally disposed separation plate positionable vertically at a desired position with respect to the water surface. In this manner the position of the horizontally disposed flat separation plate may be vertically adjusted to allow the separation plate to serve as a barrier between the floating oil layer and the water to facilitate suctioning of the floating oil layer into the vacuum head positioned directly above. A cylindrical mesh strainer means may be incorporated with the vacuum head assembly to allow fluid to enter the vacuum head while keeping solid materials from entering and clogging the vacuum head. The oil skimmer and vacuum recovery apparatus is of such construction and design as to be stable in use as it is moved along the surface of the water as the vessel moves upon the water surface.

The apparatus will separate the floating oil layer from water surface and allow the floating oil to be skimmed or drawn off the water surface by the vacuum head and collected with the vacuum in a highly efficient manner. The oil recovery apparatus of the present invention may be employed for use on contaminated areas of large bodies of contaminated water and it may also be used on small lakes, bays, ponds, and streams that are contaminated with areas of surface oil.

It is thought that the oil skimmer and vacuum recovery apparatus will be more frequently utilized with an oil collection vessel or barge that floating on the water surface. However, the vacuum head of the oil skimmer and vacuum recovery apparatus could be attached to a boom or outrigger mounted on truck or other vehicle so that it could be deployed and adjusted vertically along contaminated roadside ditches or shallow streams where a vessel is unable to float. The oil skimmer and vacuum recovery apparatus could also be provided with multiple vacuum head assemblies and these vacuum head assemblies could be temporarily or permanently mounted to a dock or pier adjacent to the water's edge. So employed these multiple vacuum head assemblies with an associated vacuum system assembly may be utilized to collect and retain oil spillage that occurs in the waters around a marina, harbor, docking, or refueling areas before the spilled oil is further disbursed in the environment.

The oil skimmer and vacuum recovery apparatus is of such simplicity it can be maintained with only minor adjustments and by only a single operator. The proposed oil skimmer and vacuum recovery apparatus is far safer to operate in a body of contaminated water than hand operated skimming devices, since its users are not required to stand at or near water's edge to handle and manipulate a vacuum nozzle above the water.

DESCRIPTION OF EMBODIMENT

Figure 1:
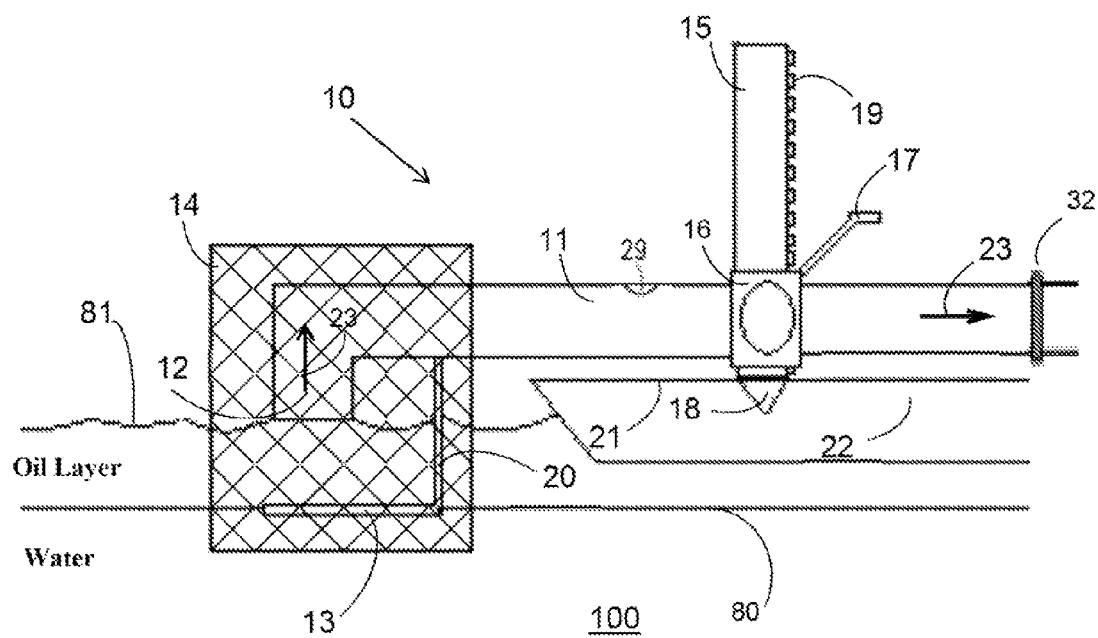
FIG. 1 is a schematic side view of the vacuum head assembly or the oil skimmer and vacuum recovery apparatus made in accordance with the present invention.
Figure 2:
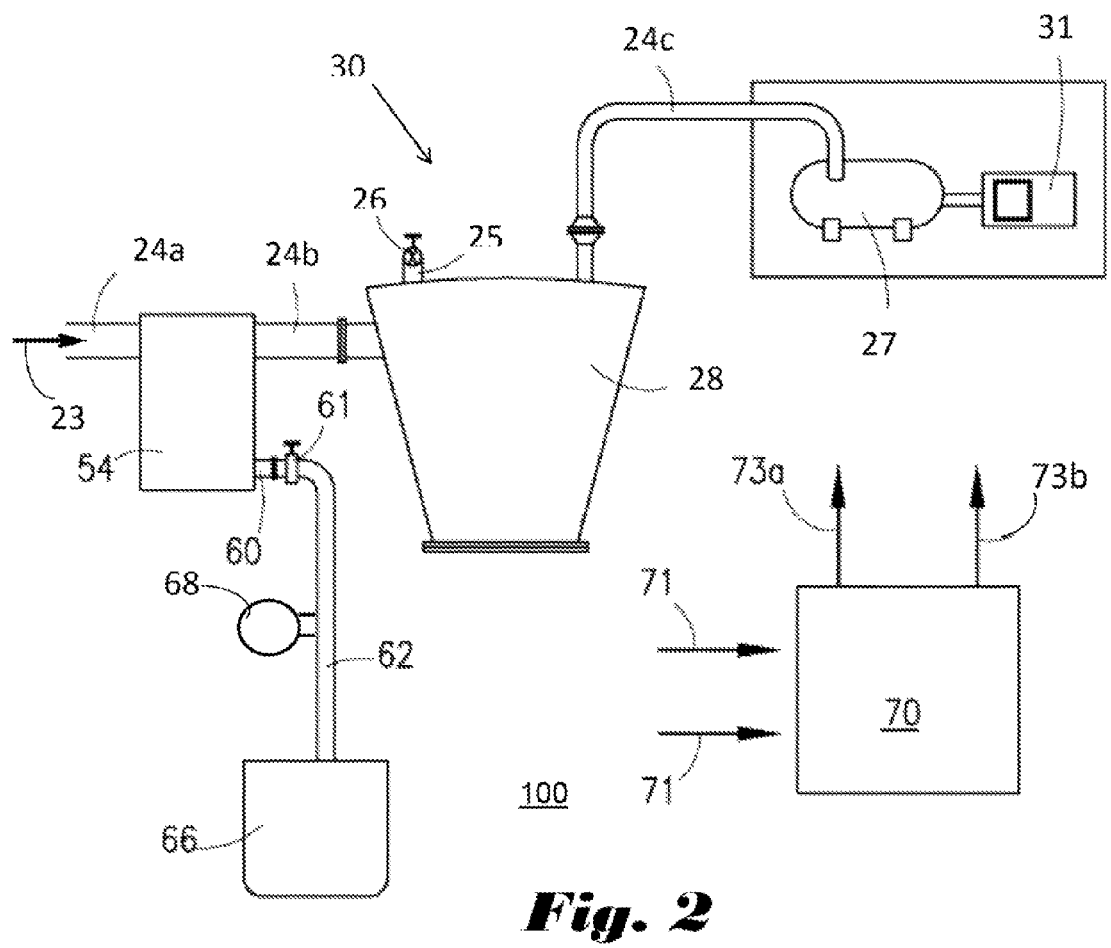
FIG. 2 is a schematic diagram of the vacuum system assembly of the oil skimmer and vacuum recovery apparatus used in conjunction with the vacuum head assembly shown in FIG. 1.

A schematic of the hands free oil skimmer and vacuum recovery apparatus (100) comprised of a vacuum head assembly (10) and a vacuum system assembly (30) is shown generally in the drawings, particularly FIGS. 1 and 2. The vacuum head assembly (10) is generally comprised of a downwardly oriented nozzle or vacuum head (12) that is positioned directly above a horizontally disposed flat separation plate (13) that will be placed in a position between the layer of floating oil (81) and the water surface (80). The vacuum head (12) is attached to a collection hose or pipe, shown as a ridged horizontally disposed pipe (11), having a vacuum connection (32) for connecting the pipe (11) to the vacuum system assembly (30) for producing a vacuum force (23) at the vacuum head (12) to suction the layer of floating oil (81). The vacuum head assembly (10) is further comprised of a means for positioning the separation plate (13) and the associated vacuum head (12) at a desired position vertically with respect to the water surface (80) which is shown as jacking means (16) connected to the pipe (11). A mesh strainer cage (14) is also provided with vacuum head assembly (10) as means for preventing solid materials from entering the downwardly oriented vacuum head (12).

The horizontally disposed flat separation plate (13) is to be positioned directly below the downwardly oriented vacuum head (12). In the embodiment shown in FIG. 1, the separation plate (13) is mounted to the ridged horizontally disposed pipe (11) below the vacuum head (12) by a baffle plate (20). The baffle plate (20) serves as a screen to direct and focus the vacuum force (23) at the vacuum head (12) on the layer of surface oil (81) to be collected. The horizontally disposed flat separation plate (13) and the vertically disposed baffle plate (20) are shown configured as a single L-shaped unit. However, the baffle plate (20) may be curved and configured at any suitable desired suitable angle with respect to the horizontally disposed flat separation plate (13). The horizontally disposed flat separation plate (13) may also be connected to the pipe (11) by other means such as an attachment bracket or other support mechanism. The baffle plate (20) may then be provided as a separate unit to be placed at a desired proximity to the separation plate (20) and the vacuum head (12). The baffle plate (20) may also be eliminated altogether from the vacuum head assembly (10).

The jacking means (16) shown in FIG. 1 is comprised of a vertically extending jacking bar (15) having a plurality of ratchet teeth (19) arrayed along its length, a manual ratcheting jacking lever (17), and a jack base (18). The jacking means (16) can be affixed by means of the jack base (18) to any suitable support surface (21) such as the deck surface of a vessel (22) such as barge or boat. The jack base (18) may be a spike as shown or another support such as a base plate mounted on or supported by the deck surface (21).

The jacking means (16) allows the separation plate (13) and the accompanying vacuum head (12) to be placed vertically to a desired position with respect to the water surface (80). To position the vacuum head (12) and separation plate (13) vertically as desired, the vacuum head (12) and separation plate (13) are mounted at one end of the rigid horizontally disposed pipe (11) and the jacking means (16) is attached to the pipe (11) so that a portion of the pipe (11), the vacuum head (12) and separation plate (13) will extend horizontally outward from the vertically extending ratchet jack bar (15). The jacking lever (17) is then manipulated to move the pipe (11) linearly up and down along the vertical ratchet bar (15) as the ratchet teeth (19) are engaged by the jacking lever (17). In this manner the pipe (11), and thus the attached vacuum head (12) and separation plate (13), may be adjustably positioned vertically, i.e. raised or lowered as desired, with respect to the water surface (80).

When properly adjusted, the separation plate (13) will be positioned to slide between the water surface (80) and the floating layer of oil (81) on the water surface (80) separating the floating oil layer (81) from the water surface (80). This will allow the vacuum or suction force (23) applied by the downwardly oriented vacuum head (12) to be directed upon the surface oil layer (81) with the separation plate (13) and its baffle plate (20) impeding the suction force applied by the vacuum head (12) to surround water. While the baffle plate (20) may be eliminated from the vacuum head assembly (10), employing the baffle plate (20) will direct the suction force (23) applied at the vacuum head (12) upon the floating oil layer (81) and reduce the vacuum force (23) directed to the water surface (80) and may enhance the efficiency of the apparatus (100).

When the separation plate (13) can be maintained in a horizontally oriented position nearly parallel to the water surface (80) where the top surface of the separation plate (13) is below the top surface of the floating oil layer (81) just at or above the water surface (80), the effectiveness of the apparatus (100) may be enhanced because the surface water area exposed to the vacuum force (23) from the vacuum head (12) will be kept at a minimum. This is more easily accomplished when there are limited winds and when the water surface is calm. It is anticipated that the position of the separation plate (13) may vary horizontally, angularly, and vertically with respect to the water surface (80) due to wave action or other factors such as the roll, pitch, heave, and yaw motion of the vessel (22) when the apparatus (100) is in use. Even if the separation plate (13) is not maintained at a position that is nearly parallel with the water surface (80) or if all or a portion of the separation plate (13) is submerged below the water surface (80), the baffling action provided by the separation plate (13), and by the baffle plate (20) if one is utilized, will still serve to at least partially block the application of the vacuum force (23) to the water surface in order to restrict the volume of surface water collected with the surface oil.

The mesh strainer cage (14) is connected to the ridged horizontally oriented pipe (11) around the vacuum head (12). The mesh strainer cage (14) provides a means of preventing solid materials on or below the water surface (80) from entering the vacuum head (12) and the pipe (11) due to the suction force applied by the downwardly oriented vacuum head (12). As shown, the mesh strainer cage (14) is configured with its top above the ridged horizontally oriented pipe (11) and its bottom below the level of the horizontally oriented flat separation plate (13). Preferably, the mesh strainer cage (14) will be enclosed on all sides to surround the ridged horizontally oriented pipe (11), the downwardly oriented vacuum head (12), the baffle plate (20), and the horizontally disposed flat separation plate (13) and prevent solid material from entering the cage (14) from the sides, top, or bottom.

It should be understood that the jacking means (16) depicted in FIG. 1 is merely an exemplary embodiment of a means for vertically positioning the separation plate (13) and vacuum head (12) at a desired position with respect to the water surface (80). Any suitable means for vertically positioning the vacuum head (12) and the separation plate (13) may be employed such as a hydraulic or pneumatic actuator, a screw jack, or another type of mechanical jack such as a vertical jack manipulated by a rack and pinion mechanism. It should also be understood that the means for vertically positioning the vacuum head (12) and the separation plate (13) may also be any vertically adjustable boom or outrigger on which the vacuum head (12) may be attached.

While the support surface (21) is shown in FIG. 1 as deck surface (21) of vessel (22), it should be understood that the support surface (21) need not be a vessel and may be a stationary permanent support surface such as a dock or pier adjacent to the water's edge. When the vacuum head assembly (10) is mounted on a dock or pier, the suction three from the vacuum head (12) and the associated vacuum system assembly (30) may be used to skim and collect the oil spillage that occurs in the waters around marinas, harbors, docking facilities, and refueling areas before the spilled oil is further disbursed in the environment. The support surface (21) may also be on a truck, trailer, or other vehicle where the jacking means (16) with the attached vacuum head assembly (10) and the vacuum system assembly (30) may be utilized in those areas were surface oil has collected on the water surface of roadside ditches or shallow streams where a waterborne vessel cannot be used.

Figure 3:
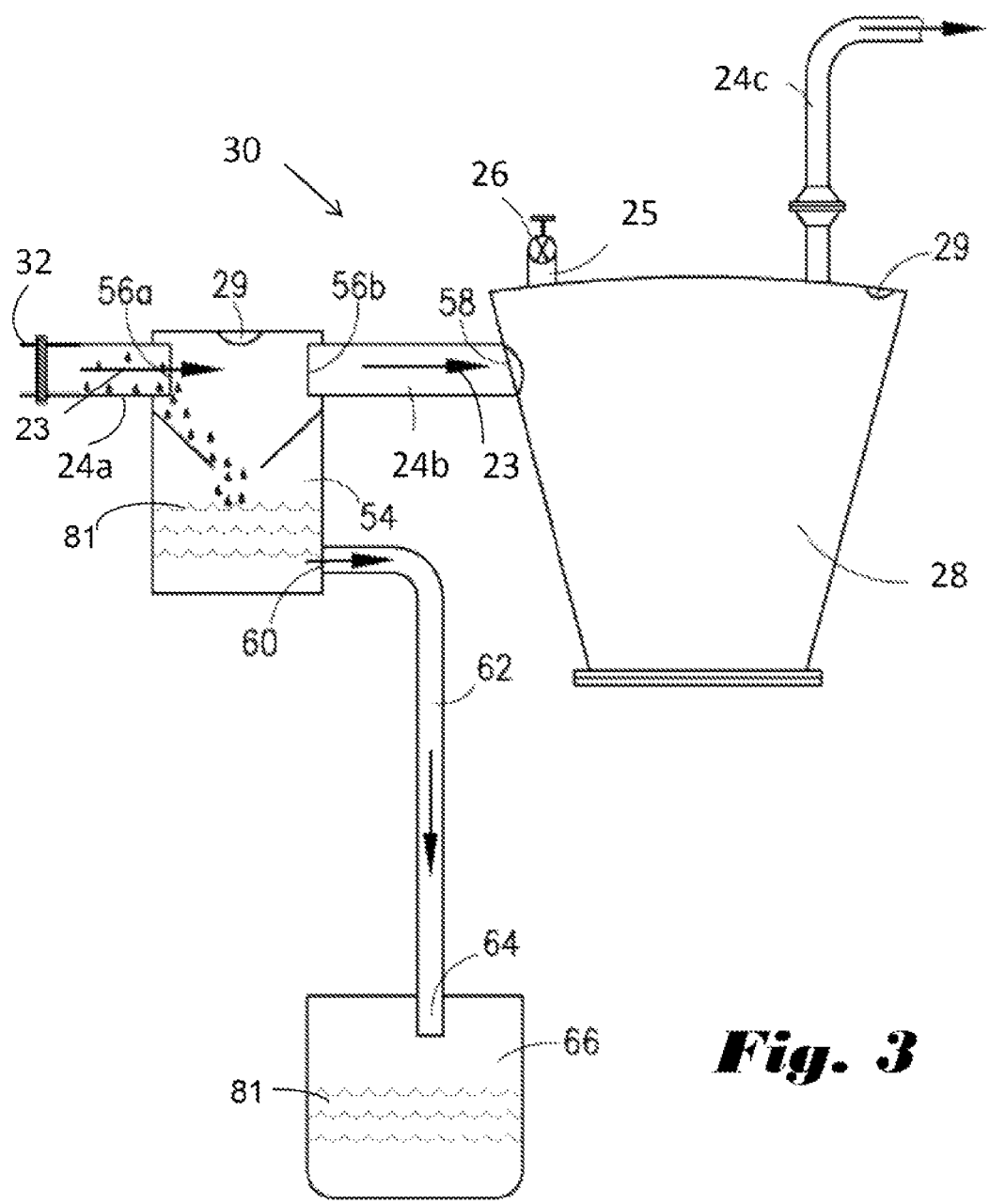
FIG. 3 is a schematic sectional view of the vacuum system assembly shown in FIG. 2.

As shown in FIGS. 2 and 3, the vacuum apparatus (30) is comprised of a motor (31) and vacuum pump (27) connected to a vacuum tank (28) by an associated vacuum line (24c). The vacuum tank (28) is connected at entry (58) to a vacuum line (24b) that is connected at entry (56b) to a fluids collection chamber (54). The fluids collection chamber (54) is further connected at entry (56a) to a fluids vacuum line (24a). The fluids vacuum line (24a) is connected to the vacuum connection (32) of pipe (11) shown in FIG. 1. When activated the vacuum pump (27) will create a vacuum within vacuum tank (28) via vacuum line (24c), a vacuum within the fluids collection chamber (54) via vacuum line (24b), and provide a desired suction force (23) at the vacuum head (12) via fluid vacuum line (24a) which is in communication with pipe (11) by means of vacuum connection (32). The suction force (23) at the vacuum head (12) will draw the oil layer (81) from the water surface (80) into the fluids collection chamber (54).

As shown in FIG. 1, the suction force at the vacuum head (12) is directed over the horizontally disposed flat separation plate (13) which is positioned so as to separate the oil layer (81) from the water surface (80). The separation plate (13) allows the suction force (23) at vacuum head (12) to be directed upon the oil layer (81) above the separation plate (13). When the suction force from the vacuum head (12) is so directed, the separation plate (13), as well as the baffle plate (20) if one is utilized, will obstruct the suction force applied to the underlying and surrounding water surface (80) so that the suction force will applied principally upon the surface oil layer (81) above and around the separation plate (13). This will allow the surface of layer (81) to skimmed from the water surface (80) and sucked into pipe (11) through the vacuum head (12) while minimizing the amount of water drawn into pipe (11) along with the surface oil layer (81) being removed.

The surface oil (81), drawn by suction through vacuum head (12) and pipe (11) into vacuum line (24a), is delivered through entry (56a) into the fluids collection chamber (54). The collected surface oil (81), and any extraneous fluids drawn along with the surface oil (81), will then spill into the fluids collection chamber (54) where it will be collected. The fluids collection chamber (54) is provided with an airtight fluids exit port (60) having an associated fluids dump valve (61). The fluids exit port (60) is in communication with a fluids discharge line (62). A discharge outlet (64) from the discharge line (62) delivers fluids discharged from the fluids collection chamber (54) into a fluid holding tank (66) or to another desired location for ultimate disposal. A dump pump (68) may be provided with the discharge line (62) to facilitate removal of the surface oil (81) and any extraneous fluids from the fluids collection tank (54). The fluids dump valve (61) may be an automatic or manually operated valve such as a butterfly valve, a gate valve, or a ball valve.

The vacuum tank (28) may be provided with a vacuum control port (25) in communication with a vacuum control or relief valve (26). The vacuum relief valve (26) is used to regulate the suction created in the vacuum tank (28) and thus the suction created in the pipe (11) and ultimately the suction force (23) created at the vacuum head (12).

Pressure monitors (29) may be positioned at desired locations throughout the vacuum system assembly (30) such as in the vacuum tank (28), the fluids collection chamber (54), or the pipe (11) to monitor and generate pressure signals (71). These pressure signals (71) may be delivered to a control panel (70) from which control signals (73a) may be generated and transmitted to the vacuum control valve (26), pump (27), or motor (31) as necessary to regulate the vacuum created in the vacuum tank (28) and the quantity of fluids delivered to the fluids collection chamber (54) and to otherwise control the vacuum system (30). The control panel (70) may also be used to receive, generate, and transmit control signals (73b) to and from the fluids dump valve (61) at the fluids exit port (60) of the fluids collection chamber (54) and to the dump pump (68) to regulate removal of the collected fluids from the fluids collection chamber (54).

The oil skimmer and vacuum recovery apparatus (100) is used by placing the apparatus (100), with the vacuum head assembly (10) connected to the vacuum system assembly (30), on a vessel on a water body, or at another desired location near or on a water body, where floating surface oil (81) is contaminating the water surface (80). The horizontally flat separation plate (13) is positioned vertically with respect to the water surface so that the separation plate (13) provides a barrier between the floating oil layer (81) and the water below. The downwardly oriented vacuum head (12) is positioned vertically at a desired location over the separation plate (13) above the floating oil layer (81). A suction force (23) is then created at the vacuum head (12) by the vacuum system assembly (30) and directed by the vacuum head (10) over the separation plate (13) and the floating surface oil (81), thereby suctioning the floating oil layer (81) from the water surface (80) and drawing the floating oil (81) into the fluids collection chamber (54) of the vacuum system assembly (30).

To use the exemplary embodiment depicted in FIGS. 1-3, the vacuum head assembly (10) is assembled by mounting the downwardly oriented vacuum head (12) and the horizontally disposed flat separation plate (13) to the ridged horizontally disposed pipe (11). The baffle plate (20) may be used to mount the separation plate (13) to the pipe (11) or the baffle plate (20) may be eliminated altogether. The mesh strainer cage (14) is then positioned around the vacuum head (12) and the horizontally disposed flat separation plate (13) and mounted to pipe (11). The pipe (11) is attached to the jacking means (16) positioned upon the deck (21) of a vessel (22). The pipe (11) is attached to the jacking means (16) so that the vacuum head (12) and separation plate (13) extend outwardly from the deck (21) so that it may be positioned vertically over the water surface (80). The vacuum system assembly (30) is then assembled with motor (27) connected to the vacuum pump (31), vacuum pump (31) connected to vacuum tank (28) via vacuum line (24c), fluids collection tank (54) connected to vacuum tank (28) via vacuum line (24b), and pipe (11) connected to fluids collection tank (54) via fluids vacuum line (24a).

The vessel (21) is then used to move the apparatus (100) to a location where the water surface (80) is contaminated by a layer of surface oil (81). Once the vessel (21) is at a desired location, then the pipe (11) is adjusted vertically by the jacking means (16) so that the horizontally disposed flat separation plate (13) is positioned between the oil layer (81) and the water surface with the downwardly oriented vacuum head (12) positioned over the separation plate (13).

With the vacuum system assembly (30) attached to the pipe (11) of the vacuum head assembly (10), the motor (27) and vacuum pump (31) are then activated to create a vacuum vacuum tank (28). Creating a vacuum in the vacuum tank (28) will create a vacuum in the fluids collection tank (54), a suction force (23) in fluid vacuum line (24a) and in pipe (11), and a suction force (23) at the vacuum head (12) whereby the floating layer oil (81) will be drawn off of the water surface (80) through vacuum head (12), pipe (11), and fluid vacuum line (24a) into fluids collection chamber (54) where the suctioned layer of oil (81) will be collected.

Positioning the separation plate (13) between the floating layer oil (81) and the surface water (81) will maximize the suction force (23) from the vacuum head (12) that is applied to the surface oil layer (81) and minimize the suction force (23) that is applied, to the water surface from the vacuum head (12). This will then maximize the amount of surface oil (81) and minimize the amount of extraneous water drawn through the vacuum head (10) and collected in the fluids collection tank (54). The suction force (23) applied to the surface oil layer (81) may be further maximized and the suction force (23) applied to the water surface may be further minimized by mounting the baffle plate (20) within a desired proximity of the separation plate (13) and the vacuum head (12).

Controlling the suction force (23) and the flow of oil (81) into and out of the fluids collection chamber (54) may be accomplished by manually controlling the vacuum relief valve, the dump valve (61), the dump pump (68), the motor (27), and the vacuum pump (31). Controlling the suction force (23) and the flow of oil (81) into and out of the fluids collection chamber (54) may also be accomplished by automatically controlling the vacuum relief valve, the dump valve (61), the dump pump (68), the motor (27), and the vacuum pump (31) by providing a generating control signals (71 and 73a, 73b) to and from the control panel (70) and the associated valves, pumps, and motors.

It is thought that the hands-free oil skimmer and vacuum recovery apparatus (100) presented herein as well as its attendant advantages will be understood from the foregoing description. It is also thought that it will be apparent that various changes may be made in the form, construction, and arrangement of the parts thereof without departing from the spirit and scope of the invention or sacrificing all of its material advantages, the form herein being merely an example embodiment of the invention.

I claim:

1. An apparatus for skimming and separating an oil layer from a water surface, comprising:
   (a) a horizontally disposed separation plate positioned between a water surface and a layer of oil floating on said water surface;
   (b) a baffle plate positioned in a desired proximity of said separation plate;
   (c) a vacuum head delivering a suction force, said vacuum head positioned vertically above said separation plate and in fluid communication with said layer of floating oil; and
   (d) wherein said separation plate and said baffle plate direct said suction force from said vacuum head to collect said layer of oil above said separation plate such that said suction force is directed ahead of said baffle plate.

2. The apparatus as recited in claim 1 further comprising a vacuum system whereby said suction force at said vacuum head is produced.

3. The apparatus as recited in claim 2 wherein the position of said separation plate with respect to said water surface may be selectively adjusted.

4. The apparatus as recited in claim 3 wherein said vacuum system includes a fluids collection tank.

5. The apparatus as recited in claim 4 further comprising a strainer impeding the introduction of solids into said vacuum head.

6. The apparatus as recited in claim 4 wherein said separation plate is flat.

7. The apparatus as recited in claim 4 wherein said separation plate, said vacuum head, and said vacuum system are employed from a vessel.

8. The apparatus as recited in claim 4 wherein said separation plate, said vacuum head, and said vacuum system are employed from a stationary onshore location.

9. The apparatus of claim 4 wherein said separation plate, said vacuum head, and said vacuum system are employed from a vehicle.

10. A method of skimming and recovering oil floating on a water surface prior to collection, comprising the steps of:
    (a) providing a separation plate horizontally disposed with respect to a water surface;
    (b) providing baffling positioned in a desired proximity to said separation plate;
    (c) adjustably positioning said separation plate to provide barrier between oil floating on said water surface and the water below;
    (d) providing a vacuum head positioned vertically at a desired location above said separation plate, wherein said vacuum head is in fluid communication with said oil floating on said water surface;
    (e) creating a suction force at said vacuum head thereby removing said floating oil from said water surface through said vacuum head, wherein said separation plate and said baffling directs said suction force to collect said layer of oil above said separation plate such that said suction force is directed ahead of said baffling; and
    (f) transporting said oil removed from said water surface by said suction force to a desire location.

11. The method as recited in claim 10 further comprising the additional step of employing said method from a vessel.

12. The method as recited in claim 10 further comprising the additional step of employing said method from an onshore location.

13. The method of claim 10 further comprising the additional step of automatically controlling said vacuum system.

14. An apparatus for skimming and separating an oil layer from the surface of water, comprising:
    (a) a flat separation plate positioned between a water surface and the bottom surface of a layer of oil floating on said water surface;
    (b) a baffle plate positioned in proximity to said separation plate;
    (c) a vacuum head positioned above said separation plate in fluid communication with said layer of oil; and
    (d) a vacuum system producing a suction force at said vacuum head, wherein said separation plate and said baffle plate direct said suction force ahead of said baffle plate whereby said floating oil is removed from said water surface.

15. The apparatus as recited in claim 14 wherein the position of said separation plate with respect to said water surface may be selectively adjusted.

16. The apparatus as recited in claim 15 wherein said vacuum system includes:
    (a) a fluids collection tank; and
    (b) a fluid vacuum line from said vacuum head to said collection fluids collection tank whereby said oil may be collected.

17. The apparatus as recited in claim 16 further comprising:
   a strainer impeding the introduction of solids into said vacuum head.

18. The apparatus as recited in claim 16 wherein said separation plate, said vacuum head, and said vacuum system are employed from a vessel.

19. The apparatus as recited in claim 16 wherein said separation plate, said vacuum head, and said vacuum, system are employed from an onshore location.

20. The apparatus of claim 16 wherein said separation plate, said vacuum head, and said vacuum system are employed from a vehicle.

21. The apparatus of claim 16 wherein said vacuum system is automatically controlled.

\* \* \* \* \*